PHOTOGRAPHIC CAMERA

Filed Feb. 17, 1964 3 Sheets-Sheet 1

PHOTOGRAPHIC CAMERA
Filed Feb. 17, 1964
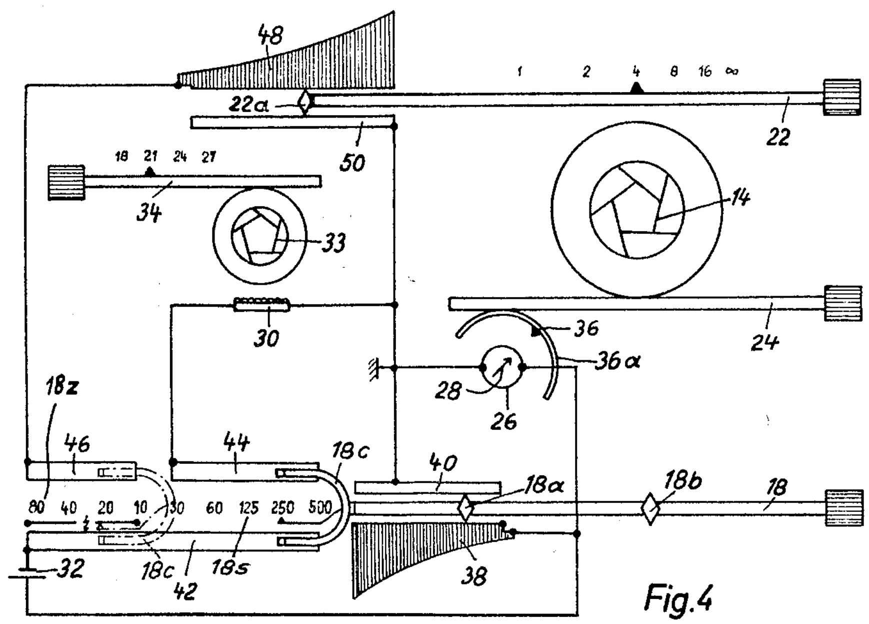
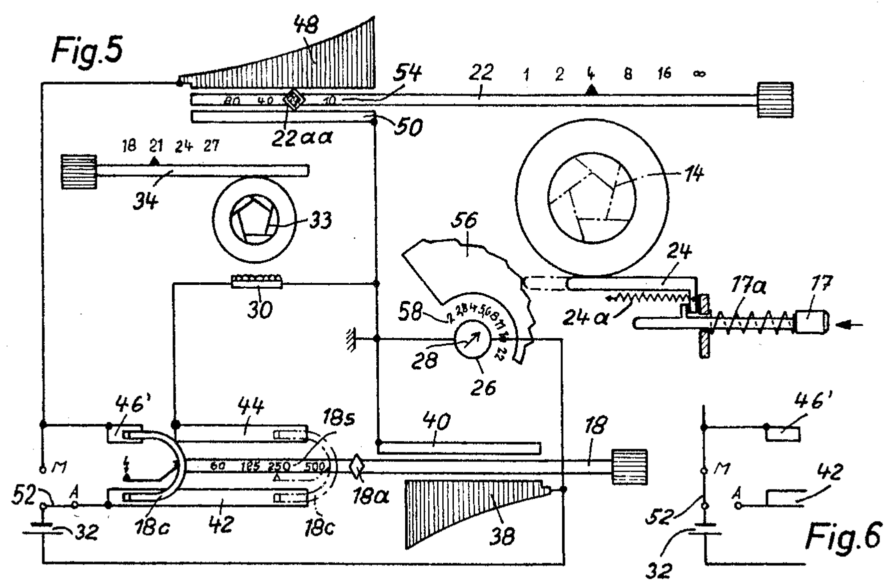

United States Patent Office 3,283,681

Patented Nov. 8, 1966

3,283,681

PHOTOGRAPHIC CAMERA

Franz Singer, Munich, and Paul Fahlenberg, Baierbrunn, Germany, assignors to Compur-Werk Gesellschaft mit beschrankter Haftung & Company, Munich, Germany, a company of Germany Filed Feb. 17, 1964, Ser. No. 345,203
Claims priority, application Germany, Feb. 22, 1963, C 29,227
11 Claims. (Cl. 95—10)

This invention relates to photographic cameras of the type having a distance setter, an exposure time setter, a diaphragm setter, and a photoelectric exposure meter having a movable element which has imparted thereto a deflection corresponding to the brightness of the object to be photographed.

In cameras of this kind it is generally known to establish or set the known factors affecting the photograph, such as exposure time, film sensitivity, distance, and flash guide number where appropriate, by turning the exposure meter as a whole in the setting operation, and to effect setting of the diaphragm in according with the deflection of the movable element of the exposure meter. The diaphragm setting itself in this case can be performed, for example, by manually moving a follow-up mark coupled to the diaphragm setter into register with the pointer of the exposure meter or by detecting or scanning the exposure meter pointer which is fixed in the measured position by a detector member connected to the diaphragm setter. In these known setting arrangements, mechanical transmission chains or drives which are very complicated and quite expensive are inserted between the setting elements and the rotatably mounted exposure meter housing, these chains or drives frequently having an unfavorable conversion in the end ranges and being powerfully self-locking.

Generally it is an object of this invention to eliminate those disadvantages of mechanical setting drives and to provide a particularly simple setting arrangement of the camera for daylight as well as flashlight photographs.

More specifically, it is an object of this invention to provide a photographic camera construction wherein the exposure meter is non-rotatably mounted as a whole in the camera casing and determines the setting of the diaphragm setter in accordance with the deflection of its movable element, wherein for daylight photographs the electrical circuit of the exposure meter includes a constant electrical source, a variable electrical resistance dependent upon the setting of the exposure time setting member, and the photo-resistance, wherein there is provided for flashlight photographs a second variable resistance dependent upon the setting of the distance setting member, and wherein a manually operable switch is provided for disconnecting from the circuit the first resisance and the photo-resistance which are used for daylight photographs, and for connecting into the circuit the second resistance for flashlight photographs.

It is a further object of this invention to provide a camera according to the foregoing construction wherein the first and second variable resistances comprise rheostats having their movable contacts carried by the exposure time setting member and the distance setting member, respectively, and wherein the change-over switch comprises sliding contacts preferably carried by the exposure time setting member for co-operation with stationary contact strips in the electrical circuit.

It is a further object of this invention to provide a camera according to the foregoing construction wherein means are provided to vary the resistance of the exposure metetr circuit in accordance with the flash guide number.

It is yet a further object of this invention to provide a photographic camera according to the foregoing constructions wherein a selector switch is provided for use in disconnecting the photo-resistance from the exposure meter circuit and for connecting into the circuit a manually adjustable electrical rheostat so as to provide for moving the movable exposure meter element to a position of deflection corresponding to any selected diaphragm aperture for daylight photographs.

Thus in a camera according to the invention, turning of the exposure meter each time is avoided, and each setting of the exposure meter pointer has a corresponding specific diaphragm value. Accordingly it does not matter whether the indication of the exposure meter is linear or otherwise in the end ranges. A correction of the possible non-linearities can, in fact, be effected without difficulty in the transmission means of the follow-up chain or the detector cam of the diaphragm setting mechanism. Furthermore, the use of a photo-resistance gives substantially more energy so that the measuring device in the exposure meter can be made substantially more robust.

Other and further objects, advantages and features of the invention will be apparent from the following description of an exemplary embodiment taken in conjunction with the accompanying drawings, wherein:

FIG. 4 is a wiring diagram of various electrical devices according to one exemplary embodiment of the invention.

FIGS. 5 and 6 are wiring diagrams of various electrical devices according to another exemplary embodiment of a setting arrangement according to the invention.

Figure 1:
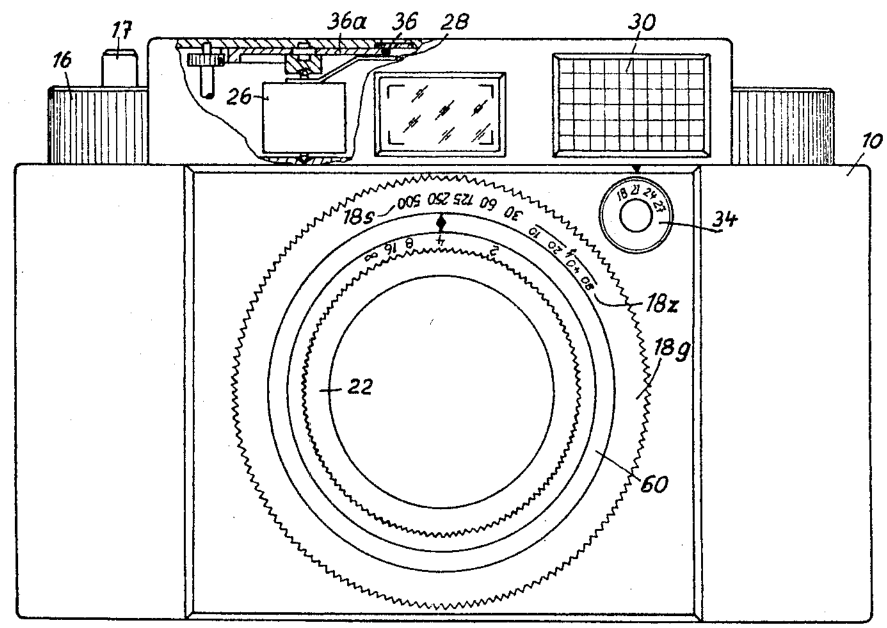
FIGS. 1 and 2 are, respectively, a front view and a plan view of an exemplary camera according to the invention.

The photographic camera illustrated has a camera casing 10 to which is secured in a known manner the housing 11 of a lens shutter in which are accommodated known mechanisms for actuating the shutter sectors 12 and the diaphragm leaves 14. Interconnected film transport and shutter tensioning means are implemented by a rapidly operable cocking lever 16, while a camera trigger 17 serves to effect release. An exposure time setter 18 is arranged at the front side of the shutter, its control cam 18*k* acting on the setting pin 20 of a conventional shutter delaying mechanism which is operable in a manner well known in the art. Distance setting is effected by a front lens mount 22 of the shutter which carries the front lens. The diaphragm leaves 14 are opened to the required aperture size by a diaphragm setting number 24.

Also provided in the camera casing 10 is a photoelectric exposure meter of known kind with its movable elements, namely the coil 26 and the pointer 28, a photo-resistance 30 and a battery 32 being incorporated in the electrical circuit of the exposure meter, as shown in FIGS. 4 and 5. A light restrictor, for example iris diaphragm 33, is mounted in front of the photo-resistance 30. This light restrictor is adjustable by means of a film sensitivity setter 34. As shown in FIG. 4, the pointer 28 has associated therewith a follow-up mark 36 which is provided on a ring 36*a*, which ring is in turn mounted coaxially with respect to the exposure meter and is coupled for movement to the diaphragm setter 24.

Referring still to FIGS. 1–4 of the drawings, associated with the exposure time setter 18 are two sliding contacts 18*a* and 18*b*, each of which can be brought into contact on the one hand with an electrical rheostat 38 and on the other hand with a contact strip 40. In addition, there is fixedly associated with the exposure time setter 18 a sliding contact 18*c* which functions as a change-over switch. Sliding contact 18*c* on the one hand is in permanent sliding contact with a contact strip 42 and on the other hand is in engagement with one of two opposed contact strips 44 and 46. There are associated with the exposure time setter 18 a time scale 18_s_ and a flash guide number scale 18_z_, as shown in FIG. 4. Similarly a sliding contact 22_a_ is associated with the range setter 22, and this contact is in sliding contact on the one hand with an electrical rheostat 48 and on the other hand with a contact strip 50.

It is believed that the circuitry of the various electrical components of the exposure meter circuit can be clearly seen from the wiring diagram of FIG. 4, and therefore it is not believed to be necessary to describe the circuit in further detail.

The setting arrangement of the camera shown in FIGS. 1–4 operates in a simple, efficient, and reliable manner. In setting the device for daylight photographs, the exposure time setter 18 and the film sensitivity setter 34 are set to the given values on their respective scales, for instance to exposure time of $\frac{1}{250}$ second with a film sensitivity of 21° DIN. In this case the sliding contact 18_c_ switches the photo-resistance 30 into the electrical circuit of the exposure meter, and the sliding contact 18_a_ determines on the rheostat 38 the resistance value corresponding to the set exposure time. The photo-resistance 30 controls an electric current corresponding to the brightness of the object to be photographed, and this electrical current brings the pointer 28 to a specific position of deflection. The operator now only has to move the diaphragm setter 24 to such an extent that the follow-up mark 36 coincides with the pointer 28. The diaphragm is thus brought to the correct diaphragm aperture size corresponding to the factors of exposure time, film sensitivity, and brightness. In the usual case the operator does not need to know the diaphragm aperture size which results automatically, but if this value is required, a fixed diaphragm scale can, for example, be associated with the exposure meter pointer 28 for control purposes. In the setting for daylight photography, it will be noted that rheostat 48 is not included in the exposure meter circuit since sliding contact 18_c_ does not connect with contact strip 46.

In setting the arrangement for flashlight photographs, the exposure time setter 18 is, as indicated in dotted lines in FIG. 4, moved to the left and set on the flash guide number scale 18_c_ to a value corresponding to the given flash guide number of the flash device. The control cam 18_k_ of the setter 18 is of such a shape that a constant exposure time of $\frac{1}{30}$ seconds remains set by the setter 18 over the whole flash guide number setting range. In this case the change-over switch 18_c_ comes into contact with the contact strip 46 so that the photo-resistance 30 is now switched out and the rheostat 48 is switched in. Sliding contact 18_a_ moves out of engagement with rheostat 38 so as to disconnect this resistance from the exposure meter circuit. However, in order to account for the set flash guide number, sliding contact 18_b_ comes into engagement with the rheostat 38 and thus determines a resistance value in the electrical circuit of the exposure meter which corresponds to the set flash guide number. On actuation of the distance setter 22, the sliding contact 22_a_ takes up a position which determines the resistance value in the electrical circuit of the exposure meter corresponding to the established distance. By moving the mark 36 to the deflected position of the pointer 28 the corresponding correct diaphragm aperture value is again produced. The resistances 38 and 48 are so correlated in relation to the adjusting range of their setters that in each set position the following equation for a flashlight photograph is fulfilled: Flash guide number=distance value×diaphragm number.

A second wiring diagram for a camera setting arrangement according to the invention is illustrated in FIGS. 5 and 6. The parts corresponding to the first example or embodiment are here indicated with the same reference numerals, and it will therefore be unnecessary to describe these parts in detail. In the embodiment of FIG. 5, a manually operable selector switch 52 is provided in the electrical circuit of the exposure meter, and this switch is movable to positions "A" (Automatic) or "M" (Manual). When set to "A" the battery 32 and the photo-resistance 30 are connected in the exposure meter circuit, whereas at the "M" setting (FIG. 6) the battery 32 and the rheostat 48 are connected into the electrical circuit of the exposure meter. The sliding contact 22_aa_ can be adjusted relative to the range setter 22 and locked on a flash guide number scale 54 in relation to the range setter 22.

A detector cam 56 is coaxially coupled for rotation to the movable elements 26 and 28 of the exposure meter and is capable of being locked in the deflected position resulting from each measurement by means of a clamping device (not shown) which is well known in the art, so as to constitute in this position a stop for the diaphragm setter 24. In the rest position of the elements, the setter 24 is held in a position corresponding to the completely open position of the diaphragm by the trigger 17 and its return spring 17_a_. Associated with the pointer 28 of the exposure meter is a fixed diaphragm scale 58.

In setting the arrangement of FIGS. 5 and 6 for daylight photographs, the selector switch 52 is set to "A," and the exposure time setter 18 is set to the required exposure time value, as shown, for instance, in dotted lines in FIG. 5. Thus the battery 32, the photo-resistance 30, and the rheostat 38 are in operation, and the pointer 28 will assume a position corresponding to the factors of exposure time, film sensitivity, and brightness. After locking of the stepped cam 56 which is moved into a deflected position during the setting operation, this locking being performed, for example, by the trigger 17 at the beginning of its release movement as indicated by the arrow in FIG. 5, and upon depression of the trigger 17, the detector pin of the diaphragm setter 24 is moved by its spring 24_a_ into the stop position indicated in dotted lines, and the diaphragm 14 is thereby moved to the aperture size likewise indicated in dotted lines.

In the usual case the operator does not need to know the aperture size of the diaphragm in this arrangement. The diaphragm scale 58 on which the pointer 28 indicates the diaphragm aperture value is provided exclusively for cases where settings are to be made by selection as will be described subsequently.

In setting the arrangement of FIGS. 5 and 6 for flashlight photographs, the selector switch 52 remains set at "A," and the exposure time setter 18 is moved to the mark designating the flashlight photograph setting, as illustrated in full lines in FIG. 5. Sliding contact 18_c_ in this position contacts contact strip 46, thus disconnecting the photo-resistance 30 and the rheostat 38, the exposure time of $\frac{1}{30}$ second required for flashlight photographs being automatically set. At the same time, the change-over switch 18_c_ switches the battery 32 and the rheostat 48 into the electrical circuit of the exposure meter, so that after adjustment of the sliding contact 22_aa_ to the appropriate flash guide number, and after the setting movement of the range setter 22, a co-ordination of the resistance values in the electrical circuit of the exposure meter correct for flashlight exposures in accordance with the flash guide number is obtained. The pointer takes up a corresponding position, and by detection of the cam 56 by the detector pin of the diaphragm setter 24, the diaphragm aperture is set as in the previous case.

If the operator or user should require a setting to any selected diaphragm aperture value which is dependent neither on the brightness nor the flash guide number and hence the distance, the switch 52 should be set to the "M" position as shown in FIG. 6. The exposure time setter 18 and the distance setter 22 are then set to the appropriate values, for instance, $\frac{1}{250}$ sec. and four meters. The photo-resistance 30 is disconnected from the circuit by virtue of the position of the switch 52, and the resistances 38 and 48 are connected into the electrical circuit of the exposure meter. Now the sliding contacts 22*aa* may be moved by hand in one or the other direction relative to the distance setter 22 and relative to the resistance 48 until the pointer 28 indicates the desired diaphragm value on the scale 58. Upon actuation of the trigger 17 adjustment of the diaphragm 14 to the selected diaphragm aperture value automatically takes place.

Figure 2:
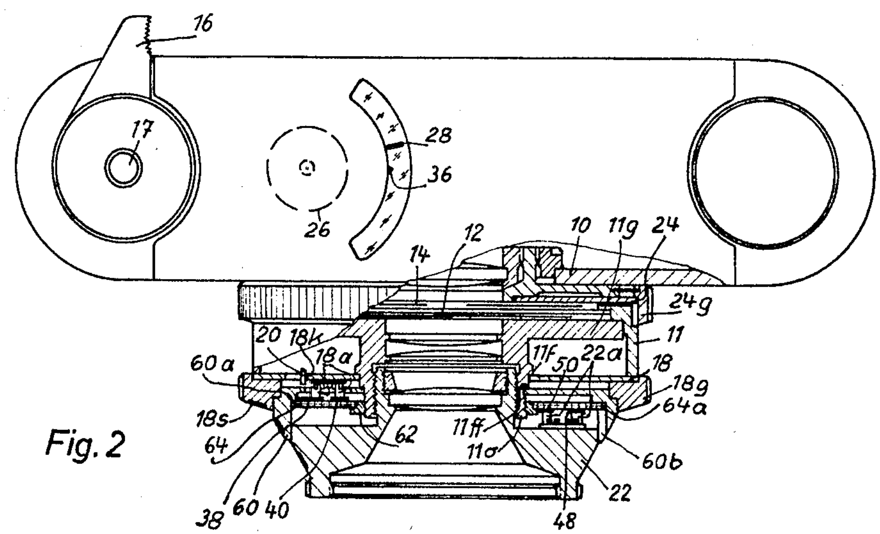
Figure 3:
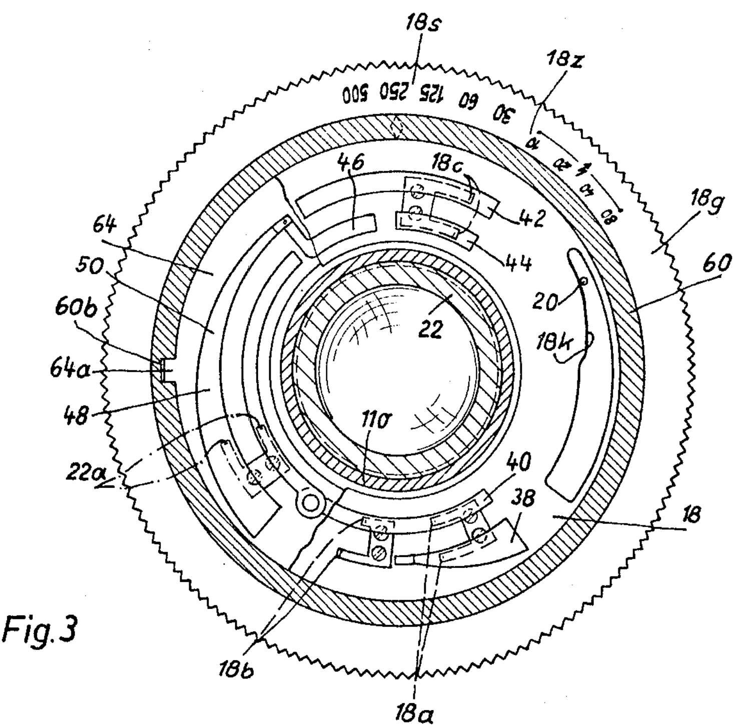
FIG. 3 is a detailed view, partly in section, of the lens shutter construction used in the camera.

Various details of the arrangement of the setting parts in the lens shutter structure are illustrated in FIGS. 2 and 3. The annular exposure time setter 18 is rotatably mounted on a guide shoulder 11*f* of the forwardly projecting lens tube 11*o* of the base plate 11*g* which is secured in the shutter housing 11. An outer ring 18*g* which is turnable by hand is connected to the exposure time setter 18. The diaphragm setter 24 is rotatably mounted at the rear side of the shutter housing 11 and is likewise coupled to an outer ring 24*g* which can be turned by hand.

Arranged between the front lens mount 22 and the exposure time setter 18 is a fixed index ring 60 which is supported on a further shoulder 11*ff* of the lens tube 11*o*. A fixed locating screw (not shown) ensures that the index ring is at the correct angular position in relation to the optical axis. An annular support plate 64 is pressed for support purposes against a shoulder 60*a* on the index 60 by a screw-threaded sleeve 62. A fixing lug 64*a* on the support plate 64 engages in a recess 60*b* in the index ring 60 to secure the support plate 64 in the correct angular position relative to the index ring 60 and hence also to the optical axis. The support plate 64 is made of an insulating material, for example hard paper, and carries on both faces thereof the rheostats 38 and 48 with the associated contact strips 42, 44, 46 and 50. The sliding contacts 18*a*, 18*b* and 18*c* which co-operate with these parts and the change-over switch 52 are secured by means of several screws on the sides of the setters 18 and 22 facing the support plate 64. The wiring terminals of these parts in the previously described electrical circuit of the exposure meter provided in the camera are, in the interest of clarity, not shown here.

Mounting of the rheostats and the contact strips on the hard paper plate is advantageously effected by deposition in a known manner.

It will be readily apparent to those skilled in the art that the exemplary embodiments of the invention described and illustrated herein are susceptible of various modifications without departing from the spirit of the invention. Therefore it should be understood that the invention is not necessarily limited to the illustrated embodiments, but rather what is believed to be new and is desired to be protected by Letters Patent is as set forth in the subjoined claims as interpreted in the light of the foregoing specification. Having fully described our invention in the manner required by the patent statutes, we claim:

1. In a photographic camera, a distance setting member; an exposure time setting member; a diaphragm setting member; an exposure meter having a movable element which is deflected in accordance with the brightness of the object to be photographed, the circuit of said exposure meter including a constant electrical source and a photo-resistance; first variable resistance means in the circuit having an electrical resistance value in accordance with the setting of said exposure time setting member; second variable resistance means having an electrical resistance value in accordance with the setting of said distance setting members; means for switching said first variable resistance and said photo-resistance out of said circuit and for switching said second variable resistance into said circuit for flashlight photographs, and vice versa for daylight photographs; and means positionable in accordance with the deflection of said movable element of said exposure meter and operatively coupled with said diaphragm setting member for the purpose of setting thereof in accordance with the deflected position of said movable element.

2. Apparatus as set forth in claim 1 wherein said first variable resistance comprises an electrical rheostat having its movable member connected to said exposure time setting member, and said second variable resistance comprises an electrical rheostat having its movable member connected to said distance setting member.

3. Apparatus as set forth in claim 1 further comprising a variable light restrictor arranged in front of said photo-resistance, and a control element for varying said light restrictor in accordance with film sensitivity.

4. Apparatus as set forth in claim 1 further comprising means for establishing in the circuit a resistance value corresponding to the flash guide number when said second resistance value is switched into the circuit.

5. Apparatus as set forth in claim 4 wherein said first variable resistance comprises an electrical rheostat having its movable contact connected to said exposure time setting member, wherein said means for establishing in the circuit a resistance value corresponding to the flash guide number comprises a movable contact connected to said exposure time setting member for contacting the rheostat of said first variable resistance when the first-mentioned movable contact has moved out of contact therewith, further comprising an exposure time scale and a flash guide number scale associated with said exposure time setting member so that the rheostat of said exposure time setting member serves to establish successively said first variable resistance value and said variable resistance value corresponding to the flash guide number.

6. Apparatus as set forth in claim 4 wherein said second variable resistance and said means for establishing a resistance value corresponding to the flash guide number comprise a rheostat having a movable contact connected to said distance setting member for movement therewith but adjustable relative thereto over a flash guide number scale whereby said rheostat takes into account both the distance setting and the flash guide number setting.

7. Apparatus as set forth in claim 5 wherein said switch means comprises movable contacts connected to said exposure time setting member.

8. Apparatus as set forth in claim 6 wherein said switch means comprises movable contacts connected to said exposure time setting member.

9. Apparatus as set forth in claim 1 further comprising a selector switch for disconnecting said photo-resistance from the circuit and for connecting into the circuit a manually adjustable variable resistance so as to permit movement of said movable element of said exposure meter to a position of deflection corresponding to any selected diaphragm aperture for daylight photographs.

10. Apparatus as set forth in claim 9 wherein said manually adjustable variable resistance comprises said second variable resistance means, said second variable resistance means comprising a rheostat having its movable contact connected to said distance setting member but adjustable relative to said distance setting member.

11. Apparatus as set forth in claim 2 wherein said exposure time setting member and said distance setting member are disposed in facing relationship, further comprising a support plate of insulating material disposed between said two members and having said electrical rheostats disposed on the faces of said support plate.

References Cited by the Examiner

UNITED STATES PATENTS 2,106,894 2/1938 Kuppenbender -------- 95—10

JOHN M. HORAN, *Primary Examiner.*